United States Patent
Chan et al.

(10) Patent No.: US 6,298,435 B1
(45) Date of Patent: Oct. 2, 2001

(54) METHODS AND APPARATUS FOR EXPLOITING VIRTUAL BUFFERS TO INCREASE INSTRUCTION PARALLELISM IN A PIPELINED PROCESSOR

(75) Inventors: Kin Shing Chan; Hung Qui Le; Dung Quoc Nguyen, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 08/633,267

(22) Filed: Apr. 16, 1996

(51) Int. Cl.[7] .................................................. G06F 9/30
(52) U.S. Cl. ........................ 712/217; 712/214; 712/216
(58) Field of Search ............................. 712/23, 214, 216, 712/217, 219; 395/706

(56) References Cited

U.S. PATENT DOCUMENTS

| | | | |
|---|---|---|---|
| 4,623,962 | * 11/1986 | Matsumoto et al. | 395/800 |
| 5,134,561 | 7/1992 | Liptay | 395/491 |
| 5,261,062 | * 11/1993 | Sato | 395/705 |
| 5,491,829 | * 2/1996 | Kau et al. | 395/800 |
| 5,546,554 | * 8/1996 | Yung et al. | 395/413 |
| 5,555,432 | * 9/1996 | Hinton et al. | 395/800 |
| 5,564,031 | * 10/1996 | Amerson et al. | 395/419 |
| 5,590,295 | * 12/1996 | Deosaran et al. | 395/393 |

* cited by examiner

Primary Examiner—Viet D. Vu
(74) Attorney, Agent, or Firm—Kelly K. Kordzik; Winstead Sechrest & Minick, P.C.; Anthony V. S. England (57) ABSTRACT

A method and apparatus for increasing instruction level parallelism using a buffer pointer assignment scheme is implemented whereby rename buffers are assigned during dispatch even though the physical rename registers may not yet be available. These virtual rename buffers are assigned by a buffer pointer assignment table. A virtual bit implemented along with each of the physical rename registers is flipped when an instruction corresponding to the entry stored within a particular physical rename register is completed and the result written to the architected register. Thus, at dispatch time, rename registers are assigned as if there were more rename buffers than there existed physical rename registers.

17 Claims, 5 Drawing Sheets

METHODS AND APPARATUS FOR EXPLOITING VIRTUAL BUFFERS TO INCREASE INSTRUCTION PARALLELISM IN A PIPELINED PROCESSOR

TECHNICAL FIELD

The present invention relates in general to a data processing system, and in particular, to a system and method for increasing the number of rename buffers available during dispatch of instructions within a processor and to increase dispatch bandwidth.

BACKGROUND INFORMATION

Computers have generally been designed in accordance with the von Neumann architecture, which is an approach to computer design characteristics of most commonly used computers, including microcomputers, attributed to the work of Hungarian-born mathematician John von Neumann. The von Neumann architecture is synonymous with the concept of a stored program—one that can be permanently stored in a computer and, because of the way it is coded, can be manipulated or made self-modifying through machine-based instructions. The familiar concept of sequential processing, a one-instruction-at-a-time approach to operations, is characteristic of von Neumann architecture.

The problem with such a sequential-instruction computer architecture is that its speed of operation is limited by how fast the logic circuitry can execute. One solution to this problem has been the design and use of superscalar microprocessor architectures, which enable the microprocessor to execute multiple instructions per clock cycle. Such a superscalar processor is the PowerPC processor made by IBM.

In such a superscalar processor, the instruction unit dispatches several instructions at one time to the various execution units within the processor. However, another problem arises with such an architecture, since some instructions are dependent upon the completion of other instructions within a program. In other words, an operation to add two operands may have to wait until another instruction is completed and produces one of the operands to be added.

Such processors also make use of what are often referred to as branch processing units, which retrieve instructions having a possible branch condition whereby two different paths can be taken within the program instruction flow depending on the results of a previous instruction. Such branch processing units predict which program branch will likely be taken by the processor, and then proceed to have the succeeding instructions within that branch begin to execute. A completion unit within the processor provides a mechanism to track instructions from dispatch through execution, and then retire or "complete" them in program order. Completing an instruction implies the commitment of the results of instruction execution to the architected registers. In-order completion insures the correct architectural state should the processor have to recover from a mispredicted branch, or any other inception or interrupt. Results of "completed" instructions are written to the architected registers.

To avoid contention for a given register file location in the course of out-of-order execution, the processor may provide rename registers for the storage of instruction results prior to their commitment to the architected registers by the completion unit. Several rename registers, or buffers, may be provided for each of the various execution units and their associated architected registers within the processor.

When the dispatch unit dispatches an instruction to its execution unit, it allocates a rename register for the results of that instruction. If an instruction is dispatched to a reservation station associated with an execution unit due to a data dependency, the dispatcher will also provide a tag to the execution unit identifying which rename register will forward the required data upon instruction completion. When the data is available in the rename register, the pending execution may begin.

Instruction results are transferred from the rename registers to the architected registers by the completion unit when an instruction is retired from the completion queue without exceptions and after any speculative branch conditions proceeding it in the completion queue have been resolved correctly. If a speculatively executed branch is found to have been incorrectly predicted, the speculatively executed instructions following the branch will be flushed from the completion queue, and the results of those instructions will be flushed from the rename registers.

A bottleneck in the dispatching of instructions can occur when all rename registers have been allocated by the dispatch unit. This will cause the dispatch unit to stall until a rename register becomes free for an assignment.

In prior art implementations, renaming schemes have been implemented which utilize complex control and data flow or use content addressable memories to alleviate the above problem. Additionally, as more execution units are implemented, more rename registers are needed in order to support the growing number of potential speculative instructions.

Therefore, there is a need in the art for a processor architecture that alleviates the above inefficiency in the dispatching of instructions.

SUMMARY OF THE INVENTION

The present invention satisfies the foregoing need by removing this bottleneck in the dispatching of instructions from the dispatch unit to the execution and completion units. This is done by allowing the dispatch unit to assign more rename buffers than there are physical rename buffers. This allows the dispatch unit to continue dispatching instructions to the execution units. As each execution unit receives an instruction to be executed, it will check to determine if there is a physical rename register available which matches the "address" of the virtual rename buffer assigned by the dispatch unit. If there is, the execution unit will execute the instruction and write the result of the instruction to the physical rename register.

Upon completion of the instruction, the result will be written from the physical rename register to the architected register, thus freeing up the physical rename register.

The foregoing is implemented through the use of a virtual bit appended to each of the physical rename buffers.

It is an object of the present invention to eliminate the need for content addressable memories and complex renaming register controls. It is also an object of the present invention to provide a virtual renaming scheme, which can assign more renamed registers (virtual rename registers) than are physically implemented. It is further an object of the present invention to provide an implementation where the number of rename registers can be changed without major changes to the processor design.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

As discussed above, register renaming is well-known in microprocessor design. By assigning renamed (temporary) registers to architected facilities, speculative execution of instructions can proceed without regard to order since the speculative results are not committed to the architected facilities until architecturally apparent order can be guaranteed.

Figure 1:
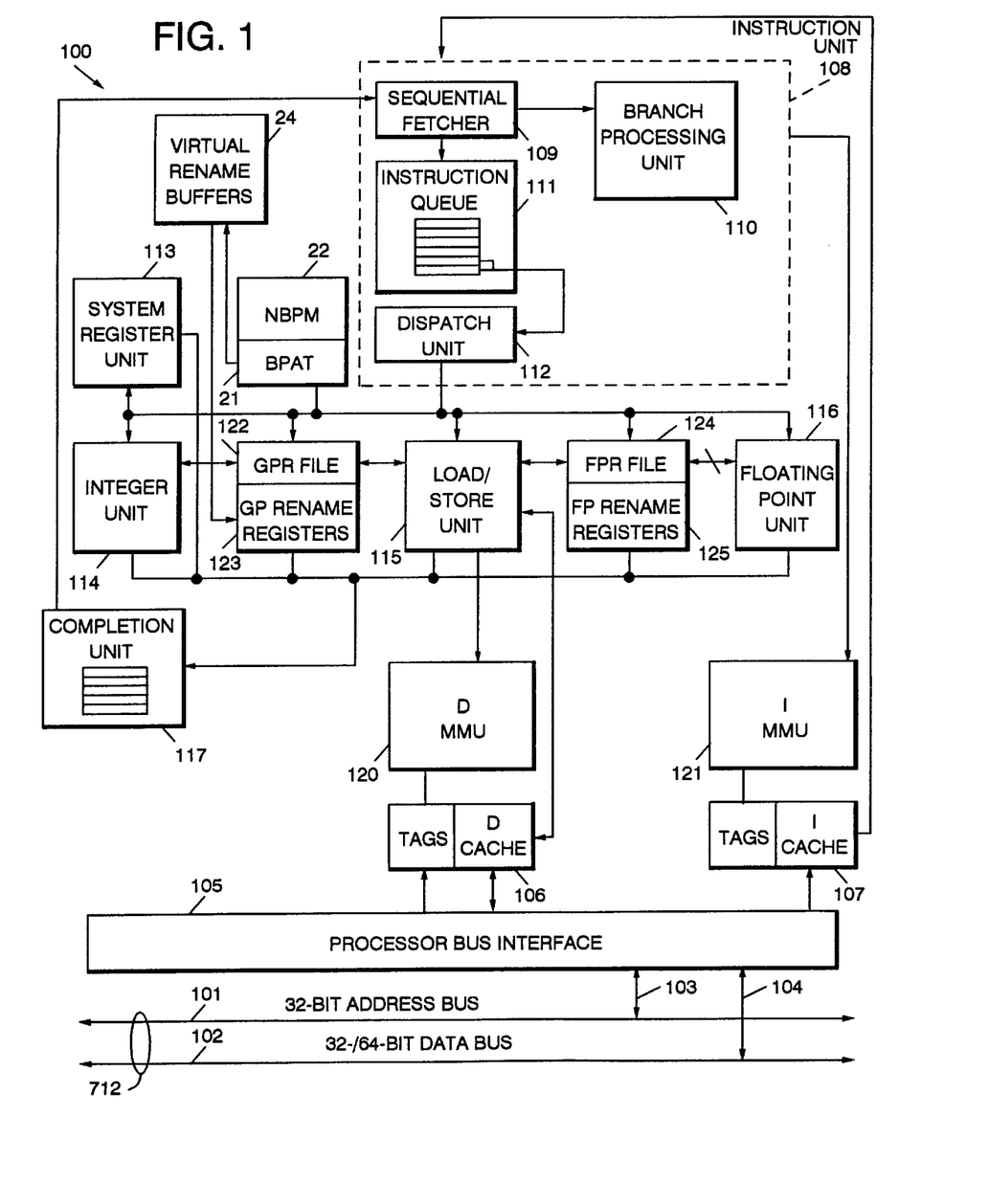
FIG. 1 illustrates, in block diagram form, a processor configured in accordance with the present invention.

Referring to FIG. 1, there is shown processor 100 coupled by buses 103 and 104 to bus 712 comprising address bus 101 and data bus 102, respectively. Processor 100 may be any known central processing unit (e.g., a PowerPC processor made by IBM) and includes some or all of the circuitry shown in FIG. 1.

Buses 103 and 104 are coupled to bus interface unit (BIU) 105. Instruction cache (I cache) 107 is coupled to BIU 105 and to sequential fetcher 109 of instruction unit 108. Instruction cache 107, which may include tag bits, is also coupled to instruction unit 108 through instruction memory management unit (I MMU) 121.

Instruction unit 108 contains sequential fetcher 109, branch processing unit (BPU) 110, instruction queue 111, and dispatch unit 112.

In a typical implementation, data is received from data bus 102 by BIU 105 and transferred through data cache (D cache) 106 to load/store unit 115. Instruction cache 107 receives instructions from BIU 105 and passes these on to fetcher 109.

BPU 10 is operable for receiving branch instructions and performing look-ahead operations on conditional branches to resolve them early. Instruction queue 111 receives instructions from sequential fetcher 109 and passes these on to dispatch unit 112. Dispatch unit 112 is operable for dispatching instruction to any one of several execution units, such as load/store unit 115, floating point unit 116, integer unit 114, and system register unit 113. These execution units are also coupled to completion unit 117, which tracks instructions from dispatch through execution, and then retires, or "completes" them in program order. Completion unit 117 contains a queue of completion buffers. Completion unit 117 is also coupled to sequential fetcher 109.

Also coupled to floating point unit 116 is floating point register (FPR) file 124 along with floating point (FP) rename registers 125.

Coupled to integer unit 114 is general purpose register (GPR) file 122 and associated general purpose (GP) rename registers 123.

Though any one of the execution units may embody the architecture of the present invention, shown in FIG. 1 is buffer pointer assignment table (BPAT) 21 and associated next buffer pointer management (NBPM) circuitry 22 coupled with virtual rename buffers 24, which are associated with GPR file 122 and GP rename registers 123. BPAT 21 contains buffer pointers. It is used to map an architected pointer to a buffer (physical) pointer. Virtual rename buffers 24 contain architected pointers. They are used to map buffer (physical) pointers to architected pointers. Physical rename registers 32 contain data (operands) that are used for execution of instructions and are subject to cancellation due to a branch or interrupt. Architected registers 122 contain data (operands) corresponding to each architected register.

Figure 2:
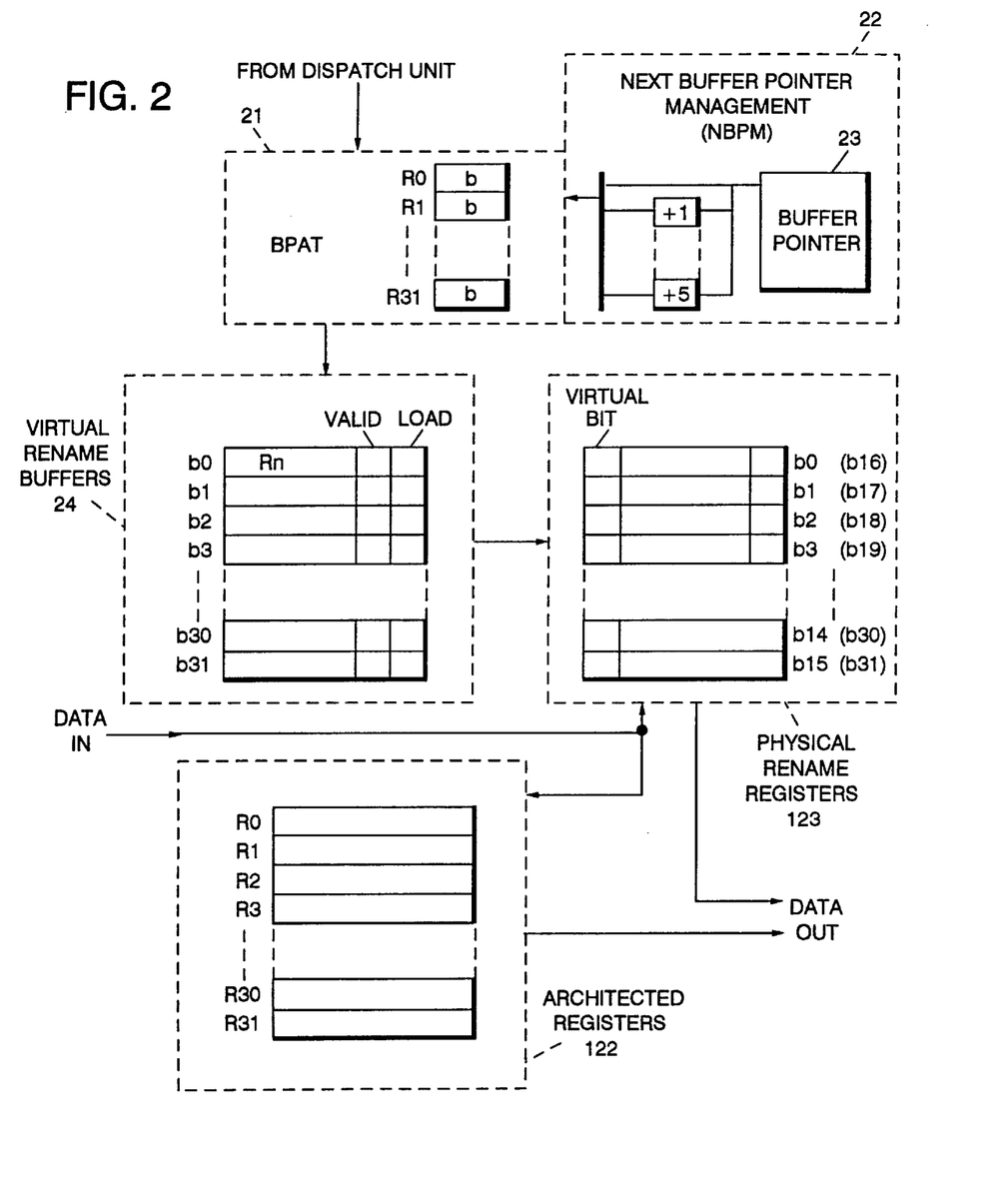
FIG. 2 illustrates, in block diagram form, an embodiment of the present invention.

Referring next to FIG. 2, there is illustrated, in block diagram form, an embodiment of the present invention BPAT 21 is defined with an entry b for each architected register pointer RK (where K is a positive integer). At dispatch time, target registers are assigned to rename buffers by assigning an available buffer for each target register. The buffers are assigned and architected source registers are looked up in the BPAT table. As a result, source rename pointers are looked up directly from the entry pointed by the architected register in the table. If the rename pointer in the architected slot is marked invalid, then the operand is available from the architected register; otherwise, the operand is marked dependent on the rename buffer pointed by the pointer in the table. Buffer assignment may be done circularly such that the buffer assignment wraps back to the first entry. The buffers are assigned with a virtual identity since there are more virtual buffers than physical ones. The buffer assignment for an instruction is sent to the execution element with the instruction. As instructions are completed, the associated buffer register is written to the architected register and the buffer is made available for assignment.

Thus, BPAT 21 assigns a virtual rename buffer 24 for the results of each instruction dispatched from dispatch unit 112. Logic within next buffer pointer management 22, using a buffer pointer circuit 23, utilizes an algorithm for assigning the next virtual rename buffer 24 for each new instruction. As discussed above, this may be done sequentially circularly. However, it would be possible to support the present invention with a somewhat more complex buffer management scheme such as a non-circular or non-sequential assignment/cancel algorithm and still be within the scope of the present invention.

Virtual rename buffers 24 may have a buffer bM corresponding to each of the architected registers 122 RK. In the example shown in FIG. 2, there are 32 virtual rename buffers 24 (M=32) and 32 architected registers 122 (K=32). However, there are only 16 physical rename registers 123 (N=16).

There is one valid bit (V) per virtual rename buffer 24. When a rename buffer 24 is assigned, the V bit is set. When the instruction completes or is cancelled, the V bit is reset. If the V bit is reset, the corresponding rename register 123 is not assigned and the current data is in architected registers 122.

There is also one load bit (L) per virtual rename buffer 24. The L bit is asserted when an operand is written to the rename buffer entry 24. It is negated when the instruction completes or is cancelled. When the V bit is set, the L bit indicates that the rename buffer 24 has been written with valid data.

Each of physical rename registers 123 also includes a virtual bit. This virtual bit allows dispatch unit 112 to pre-assign buffers that are not yet available. In this example, with 32 architected registers 122, there are 16 physical rename buffers 123. At dispatch time, rename registers 123 are assigned as if there were 32 rename registers. However, the state of the virtual bit indicates which rename buffer 24 is assigned to the physical rename register 123. Thus, physical rename register b0 could be assigned as virtual rename buffer b0 to an instruction and the virtual bit marked 0 (e.g., negated). Subsequently, physical rename register b0 could be assigned to another instruction as virtual rename buffer b16. When the instruction using physical rename register b0 as a target completes, the virtual bit is flipped to 1, or asserted, and the second instruction is allowed to use this physical rename register as its rename target. In summary, the virtual bit for a physical rename buffer is toggled when the results of the physical rename buffer are committed to the artchitected register. Hence, subsequent instructions which use this physical rename buffer can then proceed to execute.

In the present example, each of the virtual rename buffers 24 may include a 5-bit pointer so that it will point to one of the 16 physical rename registers 123. If the most significant bit within this 5-bit pointer is a 0, then that pointer will be able to point to one of physical rename registers b0 . . . b15. If the most significant bit in the pointer within a virtual rename buffer is asserted, then it will be capable of pointing to one of physical rename registers b16 . . . b31.

Other arrangements for virtual buffers are obvious and within the scope of this invention, including having more than one virtual bit in the case where the number of physical rename registers 123 is less than half the number of virtual rename buffers 24. Also, more physical rename registers 123 than architected registers 112 can be implemented within the scope of this invention, since there is no relationship between the number of architected registers 122 and rename registers 123 in this scheme.

With the assignment of virtual rename buffers in the sequentially circular manner, cancelling the speculative instructions is easily supported.

One of the advantages of the present invention is that it removes a stall condition created at dispatch unit 112 during the dispatch process and places this stall condition at the execution phase. In prior art schemes, a "bottleneck" was created at dispatch unit 112, since when all physical rename registers associated with a particular execution unit were allocated by dispatch unit 112, no more instructions could be dispatched to that particular execution unit. The present invention relieves this bottleneck by permitting assigning more rename registers than there physically exist, causing the bottleneck to be removed down to the execution portion of the process. In other words, a particular execution unit may stall when the physical rename register corresponding to the virtual rename buffer assigned to a particular instruction is not yet available. Thus, the stall condition is now dependent upon the execution of instructions within each independent execution unit, and is not dependent upon dispatch unit 112.

Figure 3:
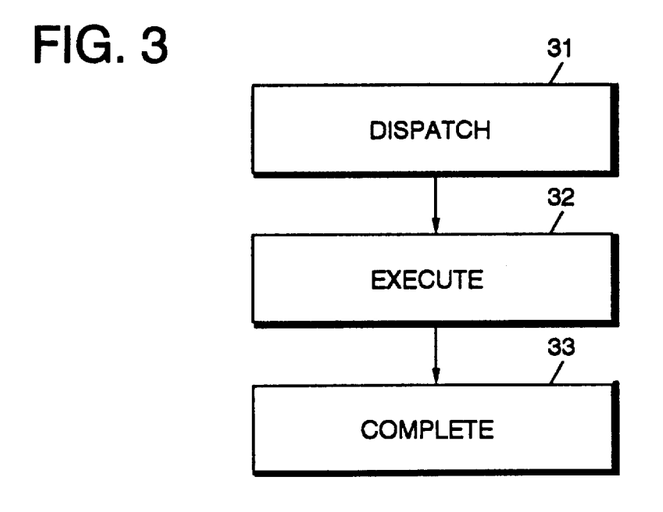
FIG. 3 illustrates a flow diagram of the various stages an instruction passes through within a processor.

Referring next to FIG. 3, there is illustrated a typical process through which an instruction proceeds within processor 100. An instruction will first be dispatched at step 31, and then will proceed through an execution phase at step 32, and then finally will proceed through a completion stage at step 33.

Figure 4:
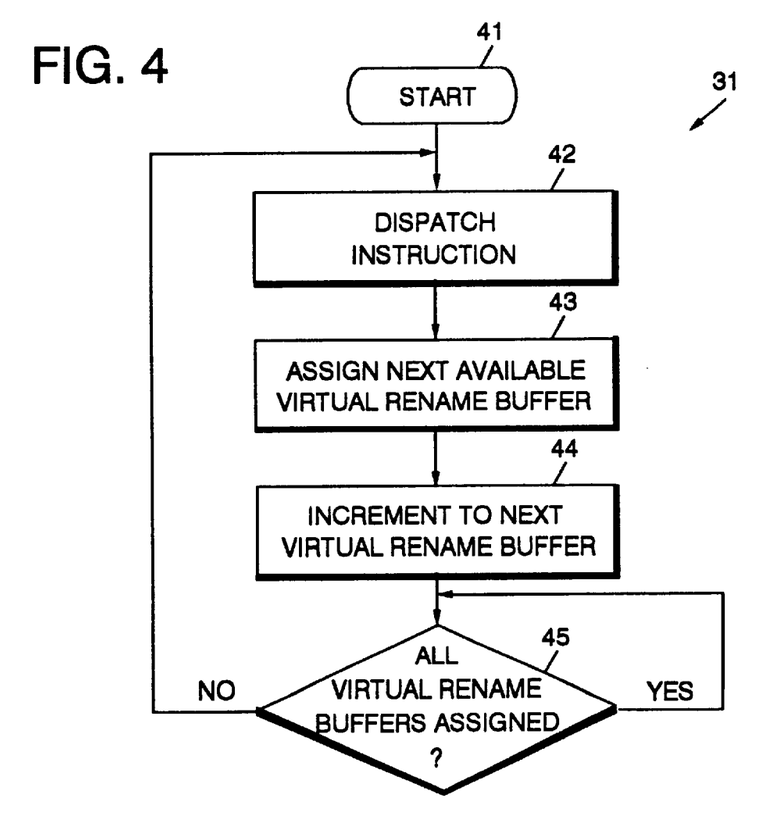
FIG. 4 illustrates a more detailed flow diagram of the dispatch step illustrated in FIG. 3.

Referring next to FIG. 4, there is illustrated a more detailed flow diagram of the dispatch step 31. A dispatch begins at step 41 and proceeds to step 42 whereby an instruction is dispatched to an execution unit from dispatch unit 112. Next, at step 43, BPAT 21 assigns the next available virtual rename buffer 24 for the results of the dispatched instruction. At step 44, NBPM 22 will increment to the next virtual rename buffer 24. At step 45, the process will return to step 42 to dispatch another instruction if there remains a virtual rename buffer 24 to be assigned by BPAT 21. Otherwise, the process stalls until a virtual rename buffer 24 is available.

As can be seen, the dispatching of instructions from dispatch unit 112 is not dependent upon the number of physical rename registers 123, but is merely dependent upon the number of implemented virtual rename buffers 24, which in this example illustrated in FIG. 2 is the same size as the number of architected registers 122.

Figure 5:
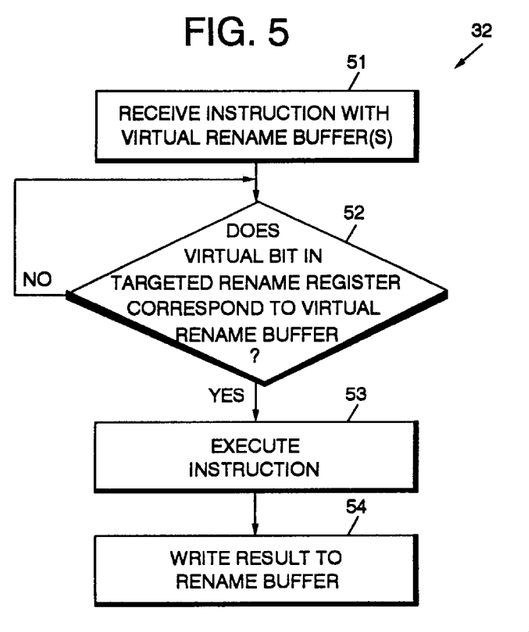
FIG. 5 illustrates a more detailed flow diagram of the execute step illustrated in FIG. 3.

Referring next to FIG. 5, there is illustrated more detail of the execution phase 32. In step 51, an execution unit receives an instruction along with the assigned virtual rename buffer(s) 24.

Next, in step 52, a stall condition may be initiated if the targeted physical rename register 123 being pointed to by the assigned virtual rename buffer 24 is not yet available. This will occur if the virtual rename buffer pointer has its most significant bit negated while the virtual bit of the physical rename register is asserted or vice versa. For example, the instruction may be assigned virtual rename buffer b0. The pointer within the virtual rename buffer b0 will be 00000 pointing to physical rename register b0. In step 52, a determination is made whether or not the physical rename register b0 has an asserted or a negated virtual bit. If the virtual bit is asserted, then that physical rename register is reserved for receiving a result of another instruction from virtual rename buffer b16. Only when that other instruction is completed will the virtual bit be flipped (negated in this example) allowing the instruction received within step 51 to be executed in step 53 and the result of the execution of that instruction stored within physical rename register b0 (step 54).

Figure 6:
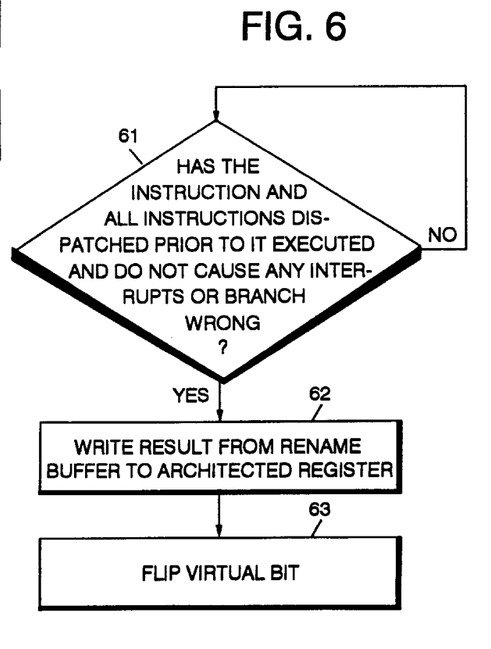
FIG. 6 illustrates a more detailed flow diagram of the completion step illustrated in FIG. 3.

Referring next to FIG. 6, there is illustrated more detail of the completion step 33. In step 61, the instruction is checked if it and all instructions that were dispatched prior to it have executed. If this instruction and all prior dispatched instructions have executed and do not cause an interrupt and do not cause a branch to be resolved wrong, then the process proceeds to step 62. In step 62, the result of that instruction stored within the physical rename register 123 is written to the architected register 122. Thus, in the aforementioned example, the result of the instruction received in step 51 and stored in step 54 within physical rename register b0 may be written to architected register R0 if R0 was assigned to virtual rename buffer b0 in BPAT 21. Afterwards, in step 63, the virtual bit corresponding to physical rename register b0 would be flipped.

The following is another example of the dispatching of instructions and the assignment of virtual rename buffers 24. Instructions I0 and I1 could be dispatched by dispatch unit 112 as follows:

I0 add R1, R2, R3
I1 add R3, R1, R2

Instruction I0 is to add operands within architected registers R2 and R3 and write the result to architected register R1. Instruction I1 is to add the value in architected register R2 and the value stored within architected register R1 (produced as a result of instruction I0) and write the result to architected register R3.

BPAT 21 may assign virtual rename buffer b0 for architected register R1. Instructions I0 and I1 will then be sent to one of the execution units, such as integer unit 114. Later, instruction I2 may be dispatched by dispatch unit 112:

I2 R6, R4, R5

Instruction I2 will add the values of R4 and R5 and store them within R6. BPAT 21 may assign R6 to virtual rename buffer b16.

The pointer corresponding to virtual rename buffer b0 assigned to instruction I0 will be 00000 (pointing to physical rename register b0), while the pointer corresponding to virtual rename buffer b16 assigned to instruction I2 will be 10000 (pointing to physical rename register b0). Note, both virtual rename buffers b0 and b16 point to physical rename register b0 within physical rename registers 123. However, the dispatching of these instructions I0 and I2 from dispatch unit 112 is not stalled but is allowed to continue, and these instructions are then passed on to integer unit 114. Integer unit 114 will execute instruction I0, and the result will be written to physical rename register b0, if the virtual bit corresponding to physical rename register b0 is negated. Instruction I2 will not be processed by integer unit 114 until instruction I0 is completed by completion unit 117 and the result stored within physical rename register b0 written to architected register R0, thus freeing up physical rename register b0. When this is performed, the virtual bit corresponding to physical rename register b0 is flipped so that it is asserted, thus allowing instruction I2 to be executed, since the result is to be written to physical rename register (hex 16) (b16).

Figure 7:
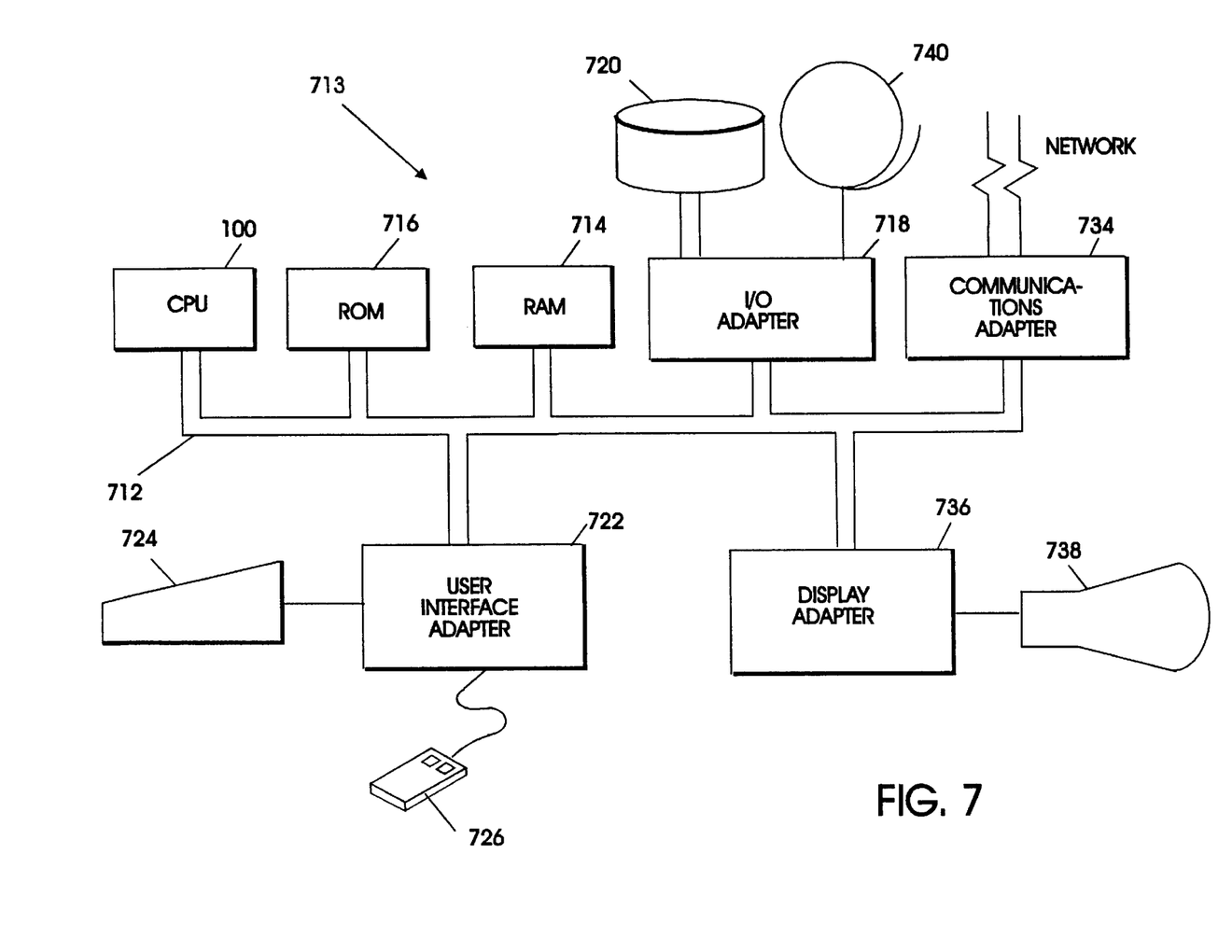
FIG. 7 illustrates a data processing system configured in accordance with the present invention.

A representative hardware environment for practicing the present invention is depicted in FIG. 7, which illustrates a typical hardware configuration of workstation 713 in accordance with the subject invention having central processing unit (CPU) 100 (see FIG. 1), and a number of other units interconnected via system bus 712. Workstation 713 shown in FIG. 7 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, and/or other user interface devices such as a touch screen device (not shown) to bus 712, communication adapter 734 for connecting workstation 713 to a data processing network, and display adapter 736 for connecting bus 712 to display device 738. CPU 100 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A processor comprising:
a set of N physical rename registers; and
circuitry for pre-assigning one of said N physical rename registers to an instruction before said one of said N physical rename registers is available to receive a result of said instruction, wherein said pre-assigning circuitry comprises circuitry for assigning M virtual rename buffers to instructions, wherein M is greater than N, wherein each of said N physical rename registers includes one or more virtual bits.

2. The processor as recited in claim 1, wherein each of said M virtual rename buffers is operable to include a pointer to one of said N physical rename registers.

3. The processor as recited in claim 2, wherein two or more of said M virtual rename buffers each point to a same one of said N physical rename registers.

4. The processor as recited in claim 3, wherein a virtual bit associated with said same one of said N physical rename registers indicates which one of said two or more of said M virtual rename buffers may be written with a result of an instruction assigned with said one of said two or more of said M virtual rename buffers.

5. A processor comprising:
a set of N physical rename registers;
circuitry for pre-assigning one of said N physical rename registers to an instruction before said one of said N physical rename registers is available to receive a result of said instruction, wherein said pre-assigning circuitry comprises circuitry for assigning M virtual rename buffers to instructions, wherein M is greater than N; and
K architected registers, wherein K≧M.

6. A processor comprising:
a set of N physical rename registers;
circuitry for pre-assigning one of said N physical rename registers to an instruction before said one of said N physical rename registers is available to receive a result of said instruction, wherein said pre-assigning circuitry comprises circuitry for assigning M virtual rename buffers to instructions, wherein M is greater than N; and
K architected registers, wherein N<K≧M.

7. A processor comprising:
a set of N physical rename registers;
circuitry for pre-assigning one of said N physical rename registers to an instruction before said one of said N physical rename registers is available to receive a result of said instruction, wherein said pre-assigning circuitry comprises circuitry for assigning M virtual rename buffers to instructions, wherein M is greater than N; and
K architected registers, wherein K≧N<M.

8. A method for assigning rename registers, said method comprising the steps of:
receiving a first instruction where a first result of an execution of said first instruction is to be written to a first architected register; and
assigning a first virtual rename buffer to correspond to said first architected register, wherein said first virtual rename buffer includes a first pointer to a first physical rename register, wherein said assigning step is performed when said first physical rename register is not available to store said first result.

9. The method as recited in claim 8, further comprising the steps of:
determining if said first physical rename register is available to store said first result;
executing said first instruction when said first physical rename register is available to store said first result; and
storing said first result of said execution of said first instruction in said first physical rename register.

10. The method as recited in claim 9, further comprising the steps of:
  completing said first instruction; and
  writing said first result from said first physical rename register to said first architected register.

11. The method as recited in claim 8, further comprising the steps of:
  receiving a second instruction where a second result of an execution of said second instruction is to be written to a second architected register; and
  assigning a second virtual rename buffer to correspond to said second architected register, wherein said second virtual rename buffer includes a second pointer to said first physical rename register.

12. A method for assigning rename registers, said method comprising the steps of:
  receiving a first instruction where a first result of an execution of said first instruction is to be written to a first architected registers;
  assigning a first virtual rename buffer to correspond to said first architected register, wherein said first virtual rename buffer includes a first pointer to a first physical rename registers, wherein said assigning step is performed whether or not said first physical rename register is available to store said first result;
  receiving a second instruction where a second result of an execution of said second instruction is to be written to a second architected register;
  assigning a second virtual rename buffer to correspond to said second architected register, wherein said second virtual rename buffer includes a second pointer to said first physical rename register;
  determining if said first physical rename register has a first address pointed to by said first pointer;
  executing said first instruction when said first physical rename register has said first address pointed to by said first pointer;
  storing said first result of said execution of said first instruction in said first physical rename register;
  completing said first instruction;
  writing said first result from said first physical rename register to said first architected register;
  transforming said first address into a second address pointed to by said second pointer;
  executing said second instruction;
  storing said second result of said execution of said second instruction in said first physical rename register;
  completing said second instruction; and
  writing said second result from said second physical rename register to said second architected register.

13. The method as recited in claim 8, wherein said first architected register is one of K architected registers associated with an execution unit in a processor, and wherein said first physical rename register is one of N physical rename registers associated with said execution unit, and wherein said first virtual rename buffer is one of M virtual rename buffers associated with said execution unit, and wherein N<M.

14. The method as recited in claim 10, wherein said completing step comprises the step of determining (1) if said first instruction and all instructions preceding said first instruction have executed, (2) if any interrupts have been caused, and (3) if a wrong branch has been taken.

15. A processor comprising:
  an execution unit;
  K architected registers associated with said execution unit;
  N physical rename registers associated with said execution unit;
  M virtual rename buffers, wherein N<M;
  a dispatch unit for receiving a first instruction where a first result of an execution of said first instruction is to be written to a first one of said K architected registers;
  a buffer pointer assignment table for assigning a first one of said M virtual rename buffers to correspond to said first one of said K architected registers, wherein said first one of said M virtual rename buffers includes a first pointer to a first one of said N physical rename registers;
  circuitry for determining if said first one of said N physical rename registers includes a first address corresponding to said first pointer;
  said execution unit executing said first instruction when said first one of said N physical rename registers includes said first address corresponding to said first pointer;
  circuitry for storing said first result of said execution of said first instruction in said first one of said N physical rename registers;
  circuitry for completing said first instruction;
  circuitry for writing said first result from said first one of said N physical rename registers to said first one of said K architected registers;
  said dispatch unit receiving a second instruction where a second result of an execution of said second instruction is to be written to a second one of said K architected registers;
  said buffer pointer assignment table assigning a second one of said M virtual rename buffers to correspond to said second one of said K architected registers, wherein said second one of said M virtual rename buffers includes a second pointer to said first one of said N physical rename registers;
  circuitry for transforming said first address into a second address pointed to by said second pointer;
  said execution unit executing said second instruction; and
  circuitry for storing said second result of said execution of said second instruction in said first one of said N physical rename registers.

16. A processor comprising:
  a set of N physical rename registers; and
  circuitry for pre-assigning one of said N physical rename registers to an instruction before said one of said N physical rename registers is available to receive a result of said instruction, wherein the pre-assigning circuitry assigns physical rename registers to a number of instructions wherein that number is greater than N, wherein at a point in time an X number of said instructions have been pre-assigned a physical rename register, wherein X is greater than N.

17. A processor comprising:
  a set of N physical rename registers; and
  circuitry for pre-assigning one of said N physical rename registers to an instruction before one of said N physical rename registers is available to receive a result of said instruction, wherein the pre-assigning circuitry continues to pre-assign physical rename registers to instructions being dispatched even though all of said physical rename registers have been allocated to an instruction.

* * * * *

UNITED STATES PATENT AND TRADEMARK OFFICE
CERTIFICATE OF CORRECTION

PATENT NO. : 6,298,435 B1
DATED : October 2, 2001
INVENTOR(S) : Kin Shing Chan, Hung Qui Le and Dung Quoc Nguyen It is certified that error appears in the above-identified patent and that said Letters Patent is hereby corrected as shown below:

Column 4,
Line 35, after "invention" please insert -- . --.

Column 7,
Line 12, "10" should be -- I0 --.
Line 16, "10" should be -- I0 --.
Line 22, "12" should be -- I2 --.

Column 8,
Line 40, "N<K$\geq$M" should be -- N<K$\leq$M --.
Line 49, "K$\geq$N<M" should be -- K$\leq$N<M --.

Column 9,
Line 19, "registers" should be -- register --.
Line 23, "registers" should be -- register --.

Signed and Sealed this

Seventh Day of May, 2002

*Attest:*

JAMES E. ROGAN
*Attesting Officer*     *Director of the United States Patent and Trademark Office*